United States Patent
Zou et al.

(10) Patent No.: US 11,916,768 B2
(45) Date of Patent: Feb. 27, 2024

(54) INFORMATION SHARING METHOD AND APPARATUS IN REDUNDANCY NETWORK, AND COMPUTER STORAGE MEDIUM

(71) Applicant: Huawei Technologies Co., Ltd., Shenzhen (CN)

(72) Inventors: Mujie Zou, Dongguan (CN); Yumeng Yang, Dongguan (CN); Tao Jin, Shenzhen (CN); Ming Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/587,548

(22) Filed: Jan. 28, 2022

(65) Prior Publication Data
US 2022/0158919 A1 May 19, 2022

Related U.S. Application Data

(63) Continuation of application No. PCT/CN2020/107215, filed on Aug. 5, 2020.

(30) Foreign Application Priority Data

Aug. 5, 2019 (CN) .......................... 201910718452.6

(51) Int. Cl.
*H04L 43/0817* (2022.01)
*H04L 1/1607* (2023.01)
(Continued)

(52) U.S. Cl.
CPC ........ *H04L 43/0817* (2013.01); *H04L 1/1607* (2013.01); *H04L 1/22* (2013.01);
(Continued)

(58) Field of Classification Search
CPC .. H04L 12/2878; H04L 45/02; H04L 43/0817
See application file for complete search history.

(56) References Cited

U.S. PATENT DOCUMENTS

| | | | |
|---|---|---|---|
| 2008/0285459 | A1 | 11/2008 | Diab et al. |
| 2009/0160943 | A1 | 6/2009 | Badt, Jr. et al. |

(Continued)

FOREIGN PATENT DOCUMENTS

| | | |
|---|---|---|
| CN | 104954105 A | 9/2015 |
| CN | 105812160 A | 7/2016 |

(Continued)

OTHER PUBLICATIONS

Nsaif, S., et al., "RMT: A Novel Algorithm for Reducing Multicast Traffic in HSR Protocol Networks", Journal of Communications and Networks, vol. 18, No. 1, Feb. 2016, 9 pages.
(Continued)

*Primary Examiner* — Barbara B Anyan
(74) *Attorney, Agent, or Firm* — Conley Rose, P.C.

(57) ABSTRACT

An information sharing method includes that a first redundancy device generates a first supervision frame that includes device information of the first redundancy device, where the first supervision frame detects whether a second redundancy device on a transmission link on which the first redundancy device is located in the redundancy network is in a working state, where the first redundancy device is any redundancy device in the redundancy network; and where the first redundancy device sends the first supervision frame to the second redundancy device in a multicast manner. The device information of the redundancy device is carried in the supervision frame.

13 Claims, 5 Drawing Sheets

| Preamble | Destination address | Source address | Protocol label | LPDU | FCS |
|---|---|---|---|---|---|

(51) Int. Cl.
*H04L 1/22* (2006.01)
*H04L 43/0876* (2022.01)
*H04L 12/28* (2006.01)
*H04L 45/02* (2022.01)

(52) U.S. Cl.
CPC ...... *H04L 12/2878* (2013.01); *H04L 43/0876* (2013.01); *H04L 45/02* (2013.01)

(56) References Cited

U.S. PATENT DOCUMENTS

| | | |
|---|---|---|
| 2015/0281335 A1 | 10/2015 | Heine et al. |
| 2016/0119225 A1 | 4/2016 | Tochio |
| 2018/0227204 A1* | 8/2018 | Magielse, Sr. ...... H04L 43/0817 |
| 2019/0028577 A1* | 1/2019 | D?Souza ................ H04L 45/02 |
| 2019/0222509 A1* | 7/2019 | Zhang ................ H04L 12/2878 |

FOREIGN PATENT DOCUMENTS

| | | |
|---|---|---|
| CN | 105991376 A | 10/2016 |
| WO | 2018048026 A1 | 3/2018 |

OTHER PUBLICATIONS

IEC 62439-3 (Edition 2.0), "Industrial Communication Networks—High availability automation networks—Part 3: Parallel Redundancy Protocol (PRP) and High-availability Seamless Redundancy (HSR)," Jul. 2012, 182 pages.

IEEE Std 802.1CB, "IEEE Standard for Local and metropolitan area networks—Frame Replication and Elimination for Reliability," IEEE Computer Society, Sep. 28, 2017, 102 pages.

Garner, G., "IEEE 802.1AS and IEEE 1588," Joint ITU-T/IEEE Workshop on The Future of Ethernet Transport, Geneva, May 28, 2010, 32 pages.

* cited by examiner

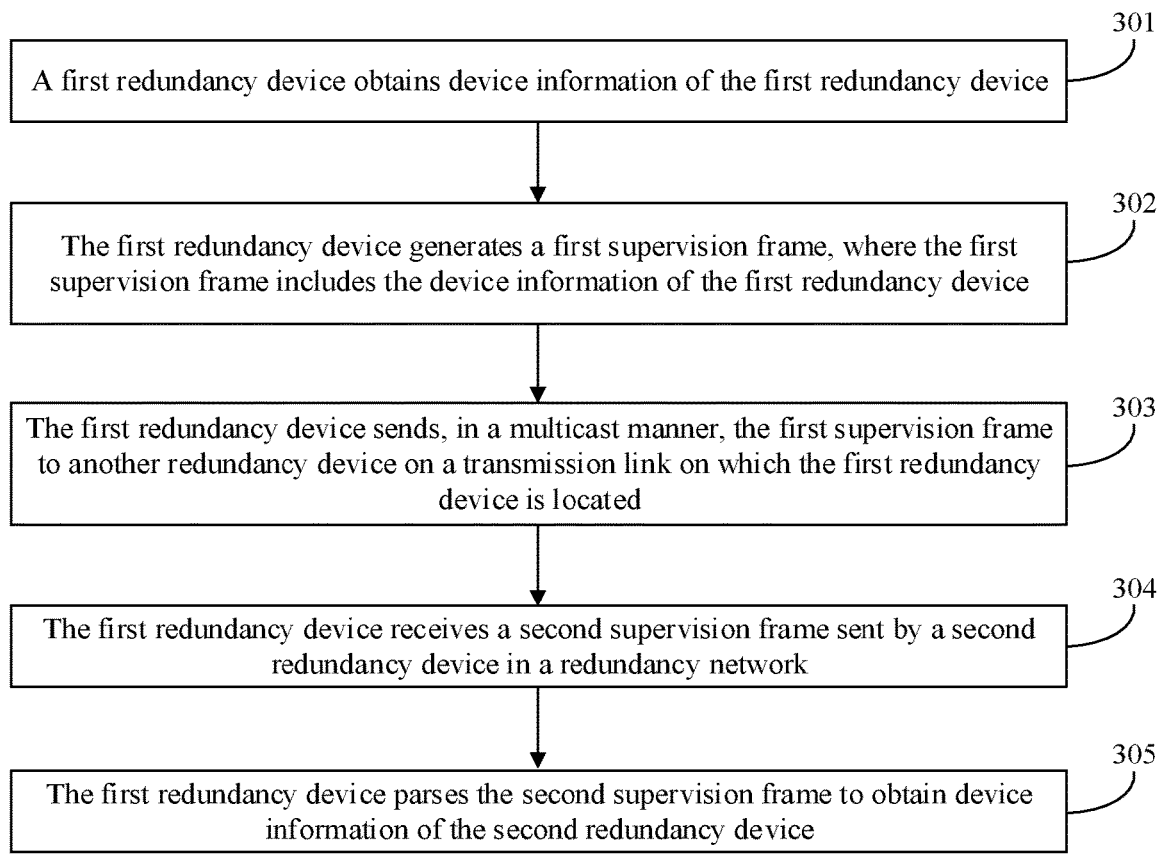

INFORMATION SHARING METHOD AND APPARATUS IN REDUNDANCY NETWORK, AND COMPUTER STORAGE MEDIUM

CROSS-REFERENCE TO RELATED APPLICATIONS

This application is a continuation of International Patent Application No. PCT/CN2020/107215 filed on Aug. 5, 2020, which claims priority to Chinese Patent Application No. 201910718452.6 filed on Aug. 5, 2019. The disclosures of the aforementioned applications are hereby incorporated by reference in their entireties.

TECHNICAL FIELD

This application relates to the field of network technologies, and in particular, to an information sharing method and apparatus in a redundancy network, and a computer storage medium.

BACKGROUND

Network resource allocation and scheduling usually need to be implemented based on device information of a plurality of network devices in a network. Therefore, information sharing needs to be implemented between network devices.

Device information sharing in a current network needs to be implemented by developing a special sharing protocol. For example, a Link Layer Discovery Protocol (LLDP) is a layer-2 protocol commonly used in the current network to implement information sharing. When information sharing is implemented by using the LLDP, each network device in the network is required to support the LLDP.

However, in an information sharing implementation process, each network device needs to periodically send a data frame that includes device information, and therefore a relatively large quantity of network transmission resources is occupied, causing relatively large network overheads.

SUMMARY

This application provides an information sharing method and apparatus in a redundancy network, and a computer storage medium, to resolve a problem that a relatively large quantity of network transmission resources is occupied in a current information sharing process, causing relatively large network overheads.

According to a first aspect, an information sharing method in a redundancy network is provided. The method includes a first redundancy device generates a first supervision frame, where the first supervision frame includes device information of the first redundancy device, the first supervision frame is used to detect whether another redundancy device on a transmission link on which the first redundancy device is located in the redundancy network is in a working state, and the first redundancy device is any redundancy device in the redundancy network, and the first redundancy device sends the first supervision frame to the other redundancy device in a multicast manner. The first supervision frame is used to detect whether the other redundancy device on the transmission link on which the first redundancy device is located in the redundancy network is in the working state, that is, the first supervision frame is used to supervise the redundancy network.

In this application, the redundancy device adds the device information of the redundancy device to the supervision frame, to implement device information sharing between a plurality of redundancy devices in the redundancy network, so that the method is compatible with an existing redundancy protocol, and the redundancy device does not need to support a specially developed sharing protocol. Therefore, development costs can be reduced. In addition, a data frame that includes the device information of the redundancy device does not need to be separately transmitted in the redundancy network, so that occupied network transmission resources can be reduced, thereby reducing network overheads.

Optionally, the first supervision frame further includes an identifier of a target redundancy device, and the identifier of the target redundancy device is used to indicate the target redundancy device to process the device information of the first redundancy device.

In this application, the identifier of the target redundancy device is carried in the supervision frame, to indicate the target redundancy device to process the device information carried in the supervision frame, and a redundancy device other than the target redundancy device does not need to process the device information carried in the supervision frame, so that directional sharing of the device information of the redundancy device can be implemented, thereby improving information sharing flexibility.

Optionally, the first supervision frame includes a link protocol data unit (LPDU) field, and the device information of the first redundancy device is carried in the LPDU field of the first supervision frame.

Because an LPDU field of a supervision frame defined in the International Electrotechnical Commission (IEC) 62439-3 standard is a blank field, in this application, the device information of the redundancy device is carried in the LPDU field of the supervision frame, and a frame structure of a current supervision frame is not changed, so that an existing redundancy network is better compatible. Optionally, the identifier of the target redundancy device is also carried in the LPDU field of the first supervision frame.

Optionally, the device information of the first redundancy device includes one or more of a sending timestamp of the first supervision frame, information about a latency between the first redundancy device and a neighboring redundancy device, port information of the first redundancy device, error reporting information of the first redundancy device, or register information of the first redundancy device.

Optionally, before the first redundancy device generates the first supervision frame that includes the device information of the first redundancy device, the first redundancy device obtains the device information of the first redundancy device.

Optionally, the first redundancy device further receives a second supervision frame sent by a second redundancy device in the redundancy network, where the second supervision frame includes device information of the second redundancy device, and the first redundancy device parses the second supervision frame to obtain the device information of the second redundancy device.

Optionally, the redundancy network is networked based on a High-availability Seamless Redundancy (HSR) Protocol and/or a Parallel Redundancy Protocol (PRP). That is, the redundancy network includes an HSR network, includes a PRP network, or includes an HSR network and a PRP network that interwork.

According to a second aspect, an information sharing apparatus in a redundancy network is provided and is used in a first redundancy device. The first redundancy device is any redundancy device in the redundancy network. The apparatus includes a plurality of functional modules. The plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided based on a specific implementation.

According to a third aspect, a redundancy device in a redundancy network is provided. The redundancy device includes a processor and a memory.

The memory is configured to store a computer program, where the computer program includes program instructions.

The processor is configured to invoke the computer program to implement the information sharing method in the redundancy network according to any one of the first aspect and the optional implementations of the first aspect.

According to a fourth aspect, a computer storage medium is provided. The computer storage medium stores instructions, and when the instructions are executed, the information sharing method in the redundancy network according to any one of the first aspect and the optional implementations of the first aspect is implemented.

According to a fifth aspect, an information sharing system in a redundancy network is provided. The system includes a plurality of redundancy devices, and each redundancy device includes the information sharing apparatus in the redundancy network according to the second aspect. Optionally, the system further includes a network management device.

Beneficial effects brought by the technical solutions provided in this application include at least the following.

According to the information sharing method in the redundancy network provided in this application, the redundancy device adds the device information of the redundancy device to the supervision frame, to implement device information sharing between a plurality of redundancy devices in the redundancy network, so that the method is compatible with an existing redundancy protocol, and the redundancy device does not need to support a specially developed sharing protocol. Therefore, development costs can be reduced. In addition, a data frame that includes the device information of the redundancy device does not need to be separately transmitted in the redundancy network, so that occupied network transmission resources can be reduced, thereby reducing network overheads. In addition, in the embodiments of this application, the identifier of the target redundancy device is carried in the supervision frame, to indicate the target redundancy device to process the device information carried in the supervision frame, and a redundancy device other than the target redundancy device does not need to process the device information carried in the supervision frame, so that directional sharing of the device information of the redundancy device can be implemented, thereby improving information sharing flexibility.

BRIEF DESCRIPTION OF THE DRAWINGS

FIG. 1 is a schematic diagram of a structure of a supervision frame defined in an IEC 62439-3 standard;

FIG. 2 is a schematic diagram of a structure of another supervision frame defined in an IEC 62439-3 standard;

FIG. 3 is a flowchart of an information sharing method in a redundancy network according to an embodiment of this application;

DESCRIPTION OF EMBODIMENTS

Figure 4:
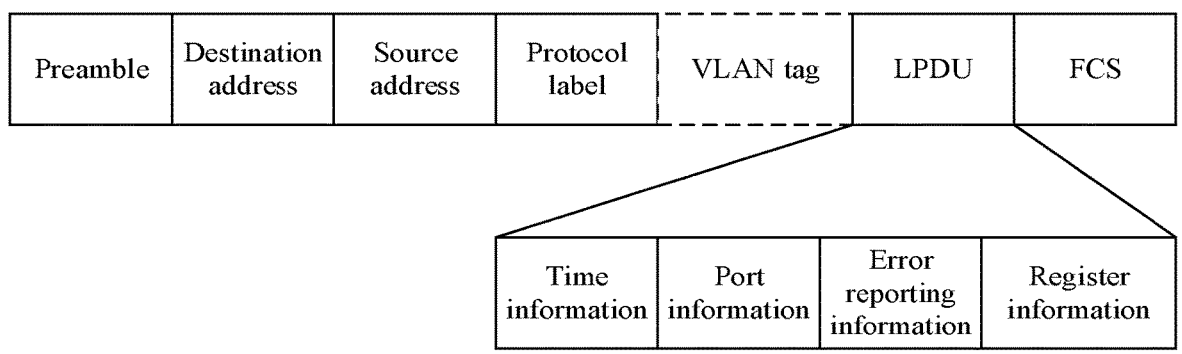
FIG. 4 is a schematic diagram of a frame structure of a supervision frame according to an embodiment of this application.

To make the objectives, technical solutions, and advantages of this application clearer, the following further describes implementations of this application in detail with reference to the accompanying drawings.

An IEC 62439-3 standard describes two redundancy protocols an HSR protocol and a PRP. A redundancy network networked based on the HSR protocol (or an HSR network) uses a ring network topology, and a redundancy network networked based on the PRP (or a PRP network) uses a dual-star network topology. Interworking between the HSR network and the PRP network can be implemented by using a redundancy box (RedBox), so that hybrid networking based on the HSR protocol and the PRP can be implemented. Therefore, a plurality of network topologies can be implemented based on a requirement.

Any redundancy network defined in the IEC 62439-3 standard usually supports supervision frame (SF) transmission, and each redundancy device in the redundancy network enables a supervision frame function. The redundancy device is a network device that supports various redundancy protocols. The redundancy network may be implemented by using a supervision frame. A principle of the implementation includes that each redundancy device in the redundancy network periodically sends a supervision frame in the redundancy network in a multicast manner, if a first redundancy device receives no supervision frame of a second redundancy device within specific time, the first redundancy device considers that the second redundancy device loses contact with the first redundancy device, and the first redundancy device deletes node information of the second redundancy device in a node table, and when supervising that the node table of the first redundancy device changes, a supervising system determines, with reference to a node table of each redundancy device, a redundancy device that is on a transmission link on which the first redundancy device is located and that is not in a working state (for example, fails), thereby implementing supervising and management on the redundancy network.

FIG. 1 is a schematic diagram of a structure of a supervision frame defined in an IEC 62439-3 standard. As shown in FIG. 1, the supervision frame includes a preamble, a destination address (destination) field, a source address (source) field, a protocol label field, an LPDU field, and a frame check sequence (FCS) field. FIG. 2 is a schematic diagram of a structure of another supervision frame defined in the IEC 62439-3 standard. As shown in FIG. 2, the supervision frame includes a preamble, a destination address field, a source address field, a protocol label field, a virtual local area network (VLAN) tag field, an LPDU field, and an FCS field. When the supervision frame is transmitted in an HSR network, the protocol label fields in the supervision frames shown in FIG. 1 and FIG. 2 are HSR label fields, or when the supervision frame is transmitted in a PRP network, the protocol label fields of the supervision frames shown in FIG. 1 and FIG. 2 are PRP label fields.

As defined in the IEC 62439-3 standard, the LPDU field in the supervision frame is used to make a length of the supervision frame reach a minimum length of an Ethernet data frame, and the LPDU field is a blank field. For explanations of the other fields in the supervision frame, refer to related definitions in the IEC 62439-3 standard. Details are not described herein in this embodiment of this application.

On a basis that any redundancy device in a current redundancy network supports supervision frame transmission, the embodiments of this application provide an information sharing method applied to a redundancy network. Device information of a redundancy device is carried in a supervision frame, to implement device information sharing between redundancy devices, so that the method is compatible with an existing redundancy protocol, and the redundancy device does not need to support a special sharing protocol. Therefore, development costs can be reduced. In addition, a data frame that includes the device information of the redundancy device does not need to be separately transmitted in the redundancy network, so that occupied network transmission resources can be reduced, thereby reducing network overheads.

Optionally, a redundancy protocol in the redundancy network provided in the embodiments of this application may include an HSR protocol, a PRP, or another future evolved redundancy protocol. This is not limited in this application. The embodiments of this application provide descriptions by using an example in which the redundancy network is networked based on the HSR protocol and/or the PRP, that is, the redundancy network provided in the embodiments of this application includes an HSR network, includes a PRP network, or includes an HSR network and a PRP network that interwork. The redundancy device in the redundancy network may be a switch, a router, a server, a terminal device, or the like.

FIG. 3 is a flowchart of an information sharing method in a redundancy network according to an embodiment of this application. As shown in FIG. 3, the method includes the following steps.

Step 301: A first redundancy device obtains device information of the first redundancy device.

The first redundancy device is any redundancy device in the redundancy network. Optionally, the device information of the first redundancy device includes one or more of a sending timestamp of a first supervision frame, information about a latency between the first redundancy device and a neighboring redundancy device, port information of the first redundancy device, error reporting information of the first redundancy device, or register information of the first redundancy device.

Optionally, a supervision frame sent by the neighboring redundancy device of the first redundancy device carries a sending timestamp of the supervision frame, and the first redundancy device determines the information about the latency between the first redundancy device and the neighboring redundancy device through calculation based on a receiving timestamp at which the supervision frame is received and the sending timestamp of the supervision frame that is carried in the supervision frame.

Optionally, the port information of the first redundancy device includes port usage, queue usage, and/or the like of the first redundancy device. The port usage is a ratio of an actual occupied capacity of a port to a total capacity of the port, and high port usage indicates a large amount of data transmitted by the port. Each redundancy device usually has a plurality of ports, a plurality of egress port queues is set in each port, and different egress port queues may be used to buffer data frames of different priorities. When queue usage of a high-priority egress port queue in a port is high, it indicates that the port is of high importance. When a redundancy device needs to transmit a data stream, a transmission path of the data stream may be determined with reference to port usage and queue usage of the redundancy device and another redundancy device on an optional transmission link. For example, if a data stream has a large data volume and a low priority, a transmission link on which each redundancy device has low port usage and low high-priority queue usage is selected to transmit the data stream.

Optionally, the error reporting information of the first redundancy device includes operating status error information of the first redundancy device and/or error information of the first redundancy device in a process of running a protocol other than a redundancy protocol.

Optionally, the register information of the first redundancy device includes information such as whether the first redundancy device enables port traffic control and/or whether the first redundancy device enables timing scheduling.

Step 302: The first redundancy device generates the first supervision frame, where the first supervision frame includes the device information of the first redundancy device.

The first supervision frame is used to detect whether another redundancy device on a transmission link on which the first redundancy device is located in the redundancy network is in a working state, that is, the first supervision frame is used to supervise the redundancy network. The first redundancy device may be located on one or more transmission links. A frame structure of the first supervision frame is shown in FIG. 1 or FIG. 2. Optionally, the device information of the target redundancy device may be carried in an LPDU field of the first supervision frame.

Because an LPDU field of a supervision frame defined in an IEC 62439-3 standard is a blank field, in this embodiment of this application, the device information of the first redundancy device is carried in the LPDU field of the first supervision frame, so that the first redundancy device can share the device information of the first redundancy device in the redundancy network in a process of transmitting the first supervision frame. In addition, in this embodiment of this application, a frame structure of a current supervision frame is not changed, so that an existing redundancy network is better compatible.

Optionally, the device information of the redundancy device may be carried in the LPDU field of the supervision frame after being encoded by using type-length-value (TLV). In this embodiment of this application, the LPDU field of the supervision frame may be divided into a plurality of subfields, and each subfield is used to carry fixed device information as one basic information element (IE).

For example, FIG. 4 is a schematic diagram of a frame structure of a supervision frame according to an embodiment of this application. As shown in FIG. 4, an LPDU field of the supervision frame includes a time information subfield, a port information subfield, an error reporting information subfield, and a register information subfield. The time information subfield is used to carry time-related information such as a sending timestamp of the supervision frame and/or information about a latency between a redundancy device and a neighboring redundancy device. The port information subfield is used to carry port information, such as port usage and/or queue usage, of the redundancy device. The error reporting information subfield is used to carry error reporting information of the redundancy device, for example, operating status error information of the redundancy device and/or error information of the redundancy device in a process of running a protocol other than a redundancy protocol. The register information subfield is used to carry register information of the redundancy device, for example, whether the redundancy device enables port traffic control and/or whether the redundancy device enables timing scheduling. A manner that is of dividing the LPDU field of the supervision frame and that is provided in this embodiment of this application is merely used as an example for description, and is not used to limit an actual division manner and a data carrying manner of the LPDU field.

Optionally, when the device information of the first redundancy device is directionally provided to a target redundancy device in the redundancy network, the first supervision frame may further include an identifier of the target redundancy device. Further, the identifier of the target redundancy device may be carried in the LPDU field of the first supervision frame. There may be one or more target redundancy devices. The identifier of the target redundancy device may be a media access control (MAC) address, a hardware address, or another identifier that can uniquely identify the redundancy device.

Figure 5:
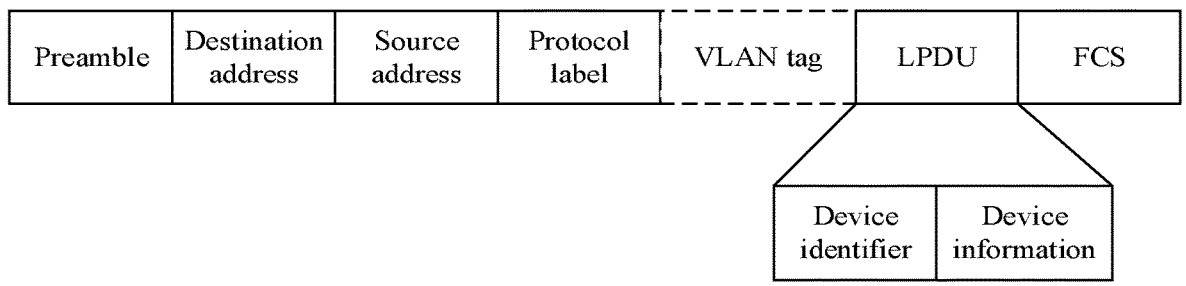
FIG. 5 is a schematic diagram of a frame structure of another supervision frame according to an embodiment of this application.

For example, FIG. 5 is a schematic diagram of a frame structure of another supervision frame according to an embodiment of this application. As shown in FIG. 5, an LPDU field of the supervision frame further includes a device identifier field. The device identifier field is used to carry an identifier of a target redundancy device. The identifier of the target redundancy device is used to indicate the target redundancy device to process device information in the supervision frame. For a manner of dividing a device information field, refer to FIG. 4.

Step 303: The first redundancy device sends, in a multicast manner, the first supervision frame to the other redundancy device on the transmission link on which the first redundancy device is located.

A destination address field of the first supervision frame is a multicast address, and is further a multicast MAC address, for example, a multicast address (01-15-4E-00-01-XX) of the supervision frame defined in the IEC 62439-3 standard, so that the first supervision frame can reach all other redundancy devices on the transmission link on which the first redundancy device is located.

Step 304: The first redundancy device receives a second supervision frame sent by a second redundancy device in the redundancy network.

An LPDU field of the second supervision frame includes device information of the second redundancy device.

Step 305: The first redundancy device parses the second supervision frame to obtain the device information of the second redundancy device.

Optionally, when a frame structure of the second supervision frame is shown in FIG. 4, the first redundancy device parses the LPDU field of the second supervision frame, and obtains the device information of the second redundancy device from the LPDU field of the second supervision frame. When a frame structure of the second supervision frame is shown in FIG. 5, the first redundancy device first parses a device identifier field of the LPDU field of the second supervision frame, and if the device identifier field includes an identifier of the first redundancy device, the first redundancy device continues to parse a device information field of the LPDU field of the second supervision frame, to obtain and process the device information of the second redundancy device, otherwise, the first redundancy device does not need to parse the device information field of the LPDU field of the second supervision frame. Alternatively, when a frame structure of the second supervision frame is shown in FIG. 5, the first redundancy device parses a device identifier field and a device information field of the LPDU field of the second supervision frame, and if the device identifier field includes an identifier of the first redundancy device, the first redundancy device obtains and processes the device information of the second redundancy device in the device information field, otherwise, the first redundancy device does not process the device information in the device information field, for example, may discard the device information in the device information field.

In this embodiment of this application, the identifier of the target redundancy device is carried in the LPDU field of the supervision frame, to indicate the target redundancy device to process the device information in the LPDU field of the supervision frame, and a redundancy device other than the target redundancy device does not need to process the device information in the LPDU field of the supervision frame, so that directional sharing of the device information of the redundancy device can be implemented, thereby improving information sharing flexibility.

In an example embodiment of this application, latency information sharing in a redundancy network may be implemented by using the foregoing information sharing method.

Figure 6:
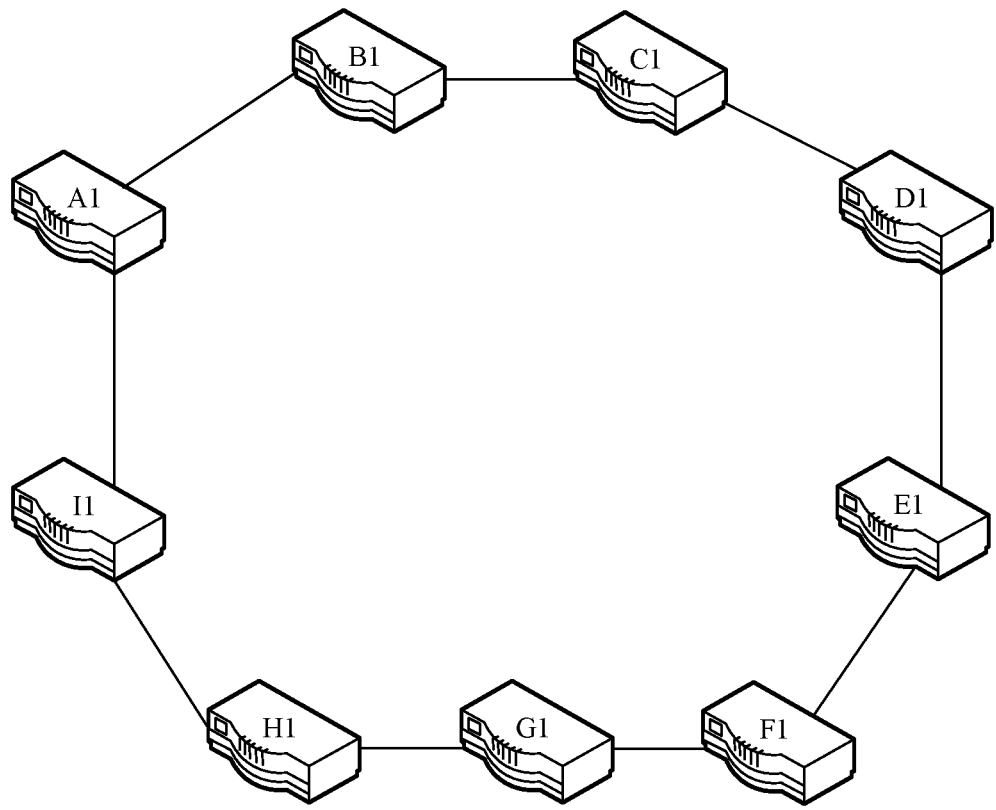
FIG. 6 is a schematic diagram of a structure of a redundancy network according to an embodiment of this application.

For example, FIG. 6 is a schematic diagram of a structure of a redundancy network according to an embodiment of this application. As shown in FIG. 6, the redundancy network is of a single ring network topology, and the redundancy network includes redundancy devices A1 to I1. A connection manner of the redundancy devices in the redundancy network is as follows: the redundancy device A1—the redundancy device B1—the redundancy device C1—the redundancy device D1—the redundancy device E1—the redundancy device F1—the redundancy device G1—the redundancy device H1—the redundancy device I1—the redundancy device A1.

First, each redundancy device in the redundancy network determines information about a latency between the redundancy device and a neighboring redundancy device based on a supervision frame.

The redundancy device A1 sends a first supervision frame, where an LPDU field of the first supervision frame includes a sending timestamp t1' at which the redundancy device A1 sends the first supervision frame. The redundancy device B1 receives the first supervision frame, and records a receiving timestamp t2 at which the first supervision frame is received. The redundancy device B1 determines, through calculation based on the receiving timestamp t2 and the sending timestamp t1' in the LPDU field of the first supervision frame, that a latency between the redundancy device A1 and the redundancy device B1 is (t2-t1'). The redundancy device B1 stores the latency determined through calculation in the redundancy device B 1. The redundancy device I1 receives the first supervision frame, and records a receiving timestamp t9" at which the first supervision frame is received. The redundancy device I1 determines, through calculation based on the receiving timestamp t9" and the sending timestamp t1' in the LPDU field of the first supervision frame, that a latency between the redundancy device A1 and the redundancy device I1 is (t9"-t1'). The redundancy device I1 stores the latency determined through calculation in the redundancy device I1.

The redundancy device B1 sends a second supervision frame, where an LPDU field of the second supervision frame includes a sending timestamp t2' at which the redundancy device B1 sends the second supervision frame. The redundancy device C1 receives the second supervision frame, and records a receiving timestamp t3 at which the second supervision frame is received. The redundancy device C1 determines, through calculation based on the receiving timestamp t3 and the sending timestamp t2' in the LPDU field of the second supervision frame, that a latency between the redundancy device B1 and the redundancy device C1 is (t3-t2'). The redundancy device C1 stores the latency determined through calculation in the redundancy device C1. Optionally, the redundancy device A1 may also calculate a latency between the redundancy device A1 and the redundancy device B1 in a similar manner, and the latency determined through calculation should be equal to the latency that is between the redundancy device A1 and the redundancy device B1 and that is determined through calculation by the redundancy device B1. To reduce calculation overheads of the redundancy device, in this embodiment of this application, only one of two adjacent redundancy devices needs to calculate a latency between the redundancy device and the other redundancy device.

The redundancy device C1 sends a third supervision frame, where an LPDU field of the third supervision frame includes a sending timestamp t3' at which the redundancy device C1 sends the third supervision frame. The redundancy device D1 receives the third supervision frame, and records a receiving timestamp t4 at which the third supervision frame is received. The redundancy device D1 determines, through calculation based on the receiving timestamp t4 and the sending timestamp t3' in the LPDU field of the third supervision frame, that a latency between the redundancy device C1 and the redundancy device D1 is (t4-t3'). The redundancy device D1 stores the latency determined through calculation in the redundancy device D1.

By analogy, latency information that is stored in each redundancy device and that is shown in Table 1 may be obtained.

TABLE 1

| Redundancy device | Receiving timestamp | Sending timestamp | Latency information |
|---|---|---|---|
| A1 | / | t1' | / |
| B1 | t2 | t2' | A1-B1: t2-t1' |
| C1 | t3 | t3' | B1-C1: t3-t2' |
| D1 | t4 | t4' | C1-D1: t4-t3' |
| E1 | t5 | t5' | D1-E1: t5-t4' |
| F1 | t6 | t6' | E1-F1: t6-t5' |
| G1 | t7 | t7' | F1-G1: t7-t6' |
| H1 | t8 | t8' | G1-H1: t8-t7' |

TABLE 1-continued

| Redundancy device | Receiving timestamp | Sending timestamp | Latency information |
|---|---|---|---|
| I1 | t9 | / | H1-I1: t9-t8' |
| I1 | t9" | / | A1-I1: t9"-t1' |

In a possible implementation, after receiving a supervision frame, the redundancy device in the redundancy network may determine, based on a source address in the supervision frame, whether a source redundancy device that sends the supervision frame is adjacent to the redundancy device, and if the source redundancy device is adjacent to the redundancy device, parse an LPDU field of the supervision frame to obtain a sending timestamp, otherwise, not parse the LPDU field of the supervision frame.

In another possible implementation, an LPDU field of a supervision frame sent by the redundancy device carries a device identifier of a neighboring redundancy device. For example, the LPDU field of the first supervision frame sent by the redundancy device A1 carries device identifiers of the redundancy device B1 and the redundancy device I1, the LPDU field of the second supervision frame sent by the redundancy device B1 carries a device identifier of the redundancy device C1, and so on. After receiving a supervision frame, the redundancy device in the redundancy network parses an LPDU field of the supervision frame, and if the LPDU field carries a device identifier of the redundancy device, obtains a sending timestamp in the LPDU field, and calculates a latency, otherwise, ignores or discards the sending timestamp in the LPDU field.

In this embodiment of this application, the sending timestamp follows an International Atomic Time (TAI) or another time standard, and is carried in an LPDU field of a supervision frame in a unit of nanosecond. For example, the sending timestamp may occupy 8 bits in the LPDU field.

Further, after determining the information about the latency between the redundancy device and the neighboring redundancy device, each redundancy device in the redundancy network generates, based on the locally stored latency information, a supervision frame that includes the latency information, and sends the supervision frame that includes the latency information, to implement latency information sharing in the redundancy network.

Optionally, when the redundancy network is a distributed architecture, each redundancy device may generate a supervision frame that includes latency information and that is shown in FIG. 4. Each redundancy device separately obtains latency information in supervision frames sent by all other redundancy devices, so that a network latency of the redundancy network can be analyzed.

Optionally, when the redundancy network is a centralized architecture, each redundancy device may generate a supervision frame that includes latency information and that is shown in FIG. 5. A device identifier field in an LPDU field of the supervision frame carries an identifier of a management redundancy device (or a centralized redundancy device or a centralized configuration node) in the redundancy network. The management redundancy device parses a received supervision frame sent by each redundancy device, and determines, based on a device identifier carried in an LPDU field, whether the management redundancy device needs to obtain and process latency information in the LPDU field. The management redundancy device may analyze, based on the latency information in the received supervision frame from each redundancy device, a network latency of the redundancy network. Certainly, the management redundancy device may alternatively report the collected latency information from each redundancy device to a network management device, for example, a controller, and the network management device analyzes the network latency of the redundancy network. After receiving a supervision frame sent by another redundancy device and parsing the supervision frame, a redundancy device other than the management redundancy device in the redundancy network does not parse device information (latency information) in an LPDU field because a device identifier in the LPDU field is not an identifier of the redundancy device.

In another example embodiment of this application, port information sharing may be performed by using the foregoing information sharing method, thereby implementing optimization path selection in a redundancy network. In some application scenarios, in a redundancy network, there is a protected signal for dual-sending and selective receiving and a non-protected signal that is not for dual-sending and selective receiving. During path selection, the non-protected signal needs to be transmitted in a different path from the protected signal, to avoid interference to the protected signal. For example, in an industrial scenario, a protected signal is usually an industrial control signal with a relatively small data amount, and the industrial control signal is usually a high-priority data frame, and a non-protected signal is usually a video signal with a relatively large data volume, and the video signal is usually a low-priority data frame. Due to the relatively large data volume of the video signal, path congestion may be caused. If the video signal and the industrial control signal are transmitted by using a same transmission path, normal transmission of the high-priority industrial control signal may be affected.

Figure 7:
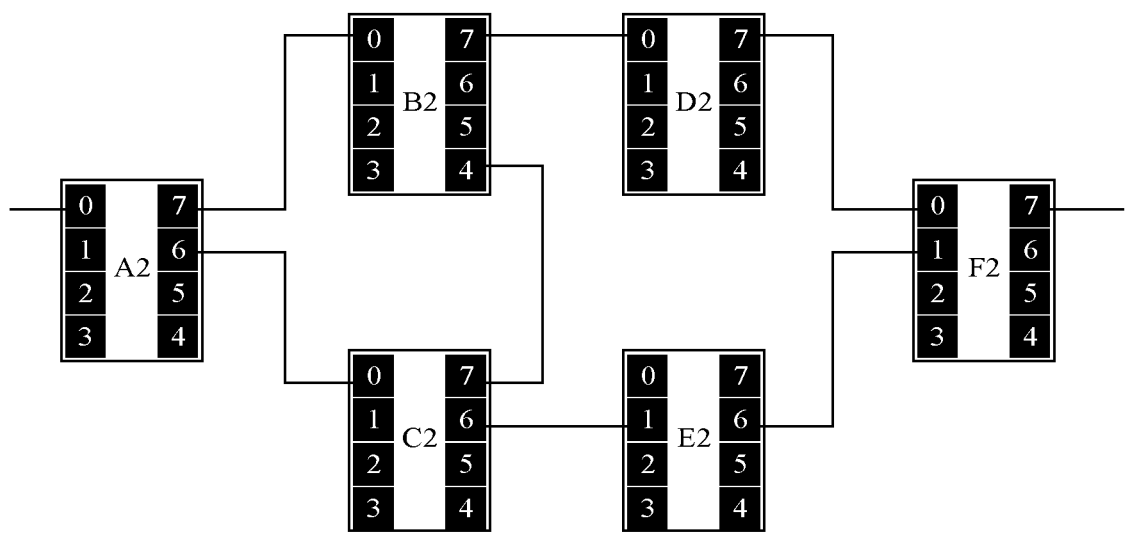
FIG. 7 is a schematic diagram of a structure of another redundancy network according to an embodiment of this application.

For example, FIG. 7 is a schematic diagram of a partial structure of another redundancy network according to an embodiment of this application. As shown in FIG. 7, the redundancy network includes a dual-ring network topology, and the redundancy network includes redundancy devices A2 to F2. It is assumed that each of the redundancy devices A2 to F2 has eight ports: ports 0 to 7. Referring to FIG. 7, a port 7 of the redundancy device A2 is connected to a port 0 of the redundancy device B2, and a port 6 of the redundancy device A2 is connected to a port 0 of the redundancy device C2, a port 7 of the redundancy device B2 is connected to a port 0 of the redundancy device D2, and a port 4 of the redundancy device B2 is connected to a port 7 of the redundancy device C2, a port 7 of the redundancy device D2 is connected to a port 0 of the redundancy device F2, a port 6 of the redundancy device C2 is connected to a port 1 of the redundancy device E2, and a port 6 of the redundancy device E2 is connected to a port 1 of the redundancy device F2. Other ports of each redundancy device may be connected to other devices, which is not shown in the figure. There are four transmission paths between the redundancy device A2 and the redundancy device F2. A first transmission path is the redundancy device A2—the redundancy device B2—the redundancy device D2—the redundancy device F2, a second transmission path is: the redundancy device A2—the redundancy device C2—the redundancy device B2—the redundancy device D2—the redundancy device F2, a third transmission path is: the redundancy device A2—the redundancy device B2—the redundancy device C2—the redundancy device E2—the redundancy device F2, and a fourth transmission path is the redundancy device A2—the redundancy device C2—the redundancy device E2—the redundancy device F2.

Each of the redundancy devices A2 to F2 in the redundancy network carries port occupation information of the redundancy device in a periodically sent supervision frame. If the port 6 of the redundancy device C2 is occupied by a high-priority data frame, or the redundancy device C2 determines, based on port occupation information in a supervision frame sent by the redundancy device E2, that the port 1 and/or the port 6 of the redundancy device E2 are/is occupied by a high-priority data frame, when receiving, by using a port 3, a low-priority data frame that needs to be transmitted to the redundancy device F2, the redundancy device C2 chooses to send the low-priority data frame from a port 7, that is, selects a transmission path that is the redundancy device C2—the redundancy device B2—the redundancy device D2—the redundancy device F2, to transmit the low-priority data frame, to avoid interference to the high-priority data frame.

A sequence of the steps of the information sharing method in the redundancy network provided in this embodiment of this application may be appropriately adjusted. For example, step 304 and step 305 may be alternatively performed before step 301 to step 303. Alternatively, a step may be correspondingly added or deleted based on a case. Any variation readily figured out by a person skilled in the art within the technical scope disclosed in this application shall fall within the protection scope of this application. Therefore, details are not described herein.

In conclusion, according to the information sharing method in the redundancy network provided in this embodiment of this application, the redundancy device adds the device information of the redundancy device to the supervision frame, to implement device information sharing between a plurality of redundancy devices in the redundancy network, so that the method is compatible with an existing redundancy protocol, and the redundancy device does not need to support a specially developed sharing protocol. Therefore, development costs can be reduced. In addition, a data frame that includes the device information of the redundancy device does not need to be separately transmitted in the redundancy network, so that occupied network transmission resources can be reduced, thereby reducing network overheads. In addition, in this embodiment of this application, the identifier of the target redundancy device is carried in the supervision frame, to indicate the target redundancy device to process the device information carried in the supervision frame, and a redundancy device other than the target redundancy device does not need to process the device information carried in the supervision frame, so that directional sharing of the device information of the redundancy device can be implemented, thereby improving information sharing flexibility.

Figure 8:
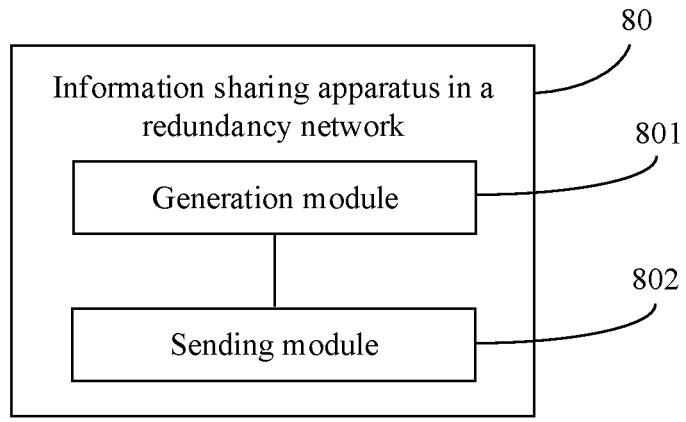
FIG. 8 is a schematic diagram of a structure of an information sharing apparatus in a redundancy network according to an embodiment of this application.

FIG. 8 is a schematic diagram of a structure of an information sharing apparatus in a redundancy network according to an embodiment of this application. The information sharing apparatus is used in a first redundancy device, and the first redundancy device is any redundancy device in the redundancy network. As shown in FIG. 8, an apparatus 80 includes a generation module 801 configured to generate a first supervision frame, where the first supervision frame includes device information of the first redundancy device, and the first supervision frame is used to detect whether another redundancy device on a transmission link on which the first redundancy device is located in the redundancy network is in a working state, and a sending module 802 configured to send the first supervision frame to the other redundancy device in a multicast manner.

Optionally, the first supervision frame further includes an identifier of a target redundancy device, and the identifier of the target redundancy device is used to indicate the target redundancy device to process the device information of the first redundancy device.

Optionally, the first supervision frame includes an LPDU field, and the device information of the first redundancy device is carried in the LPDU field of the first supervision frame.

Optionally, the device information of the first redundancy device includes one or more of a sending timestamp of the first supervision frame, information about a latency between the first redundancy device and a neighboring redundancy device, port information of the first redundancy device, error reporting information of the first redundancy device, or register information of the first redundancy device.

Figure 9:
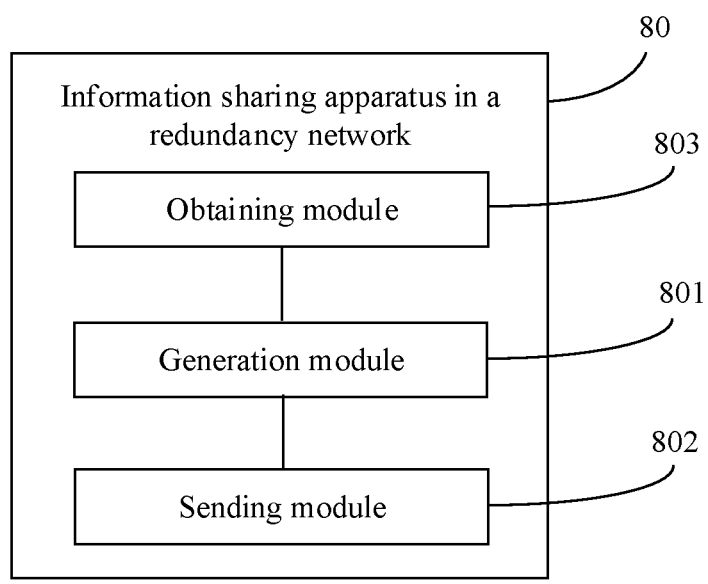
FIG. 9 is a schematic diagram of a structure of another information sharing apparatus in a redundancy network according to an embodiment of this application.

Optionally, as shown in FIG. 9, the apparatus 80 further includes an obtaining module 803 configured to obtain the device information of the first redundancy device.

Figure 10:
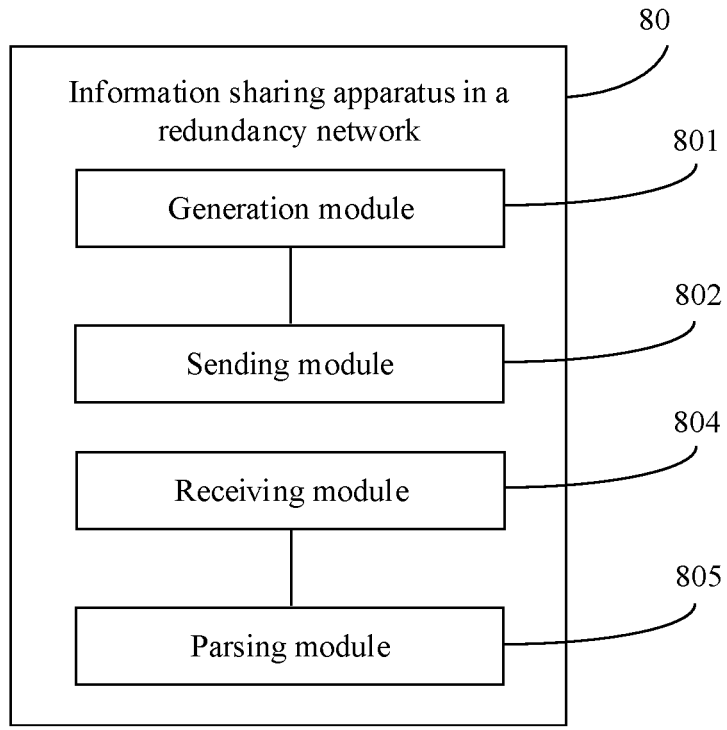
FIG. 10 is a schematic diagram of a structure of still another information sharing apparatus in a redundancy network according to an embodiment of this application.

Optionally, as shown in FIG. 10, the apparatus 80 further includes a receiving module 804 configured to receive a second supervision frame sent by a second redundancy device in the redundancy network, where the second supervision frame includes device information of the second redundancy device, and a parsing module 805 configured to parse the second supervision frame to obtain the device information of the second redundancy device.

Optionally, the redundancy network is networked based on an HSR protocol and/or a PRP.

For details not described herein, refer to the detailed descriptions in the information sharing method in the redundancy network shown in FIG. 3.

To sum up, according to the information sharing apparatus in the redundancy network provided in this embodiment of this application, the redundancy device adds the device information of the redundancy device to the supervision frame, to implement device information sharing between a plurality of redundancy devices in the redundancy network, so that the method is compatible with an existing redundancy protocol, and the redundancy device does not need to support a specially developed sharing protocol. Therefore, development costs can be reduced. In addition, a data frame that includes the device information of the redundancy device does not need to be separately transmitted in the redundancy network, so that occupied network transmission resources can be reduced, thereby reducing network overheads. In addition, in this embodiment of this application, the identifier of the target redundancy device is carried in the supervision frame, to indicate the target redundancy device to process the device information carried in the supervision frame, and a redundancy device other than the target redundancy device does not need to process the device information carried in the supervision frame, so that directional sharing of the device information of the redundancy device can be implemented, thereby improving information sharing flexibility.

For the apparatus in the foregoing embodiment, a specific manner of performing an operation by each module is described in detail in the embodiments related to the method. Details are not described herein again.

Figure 11:
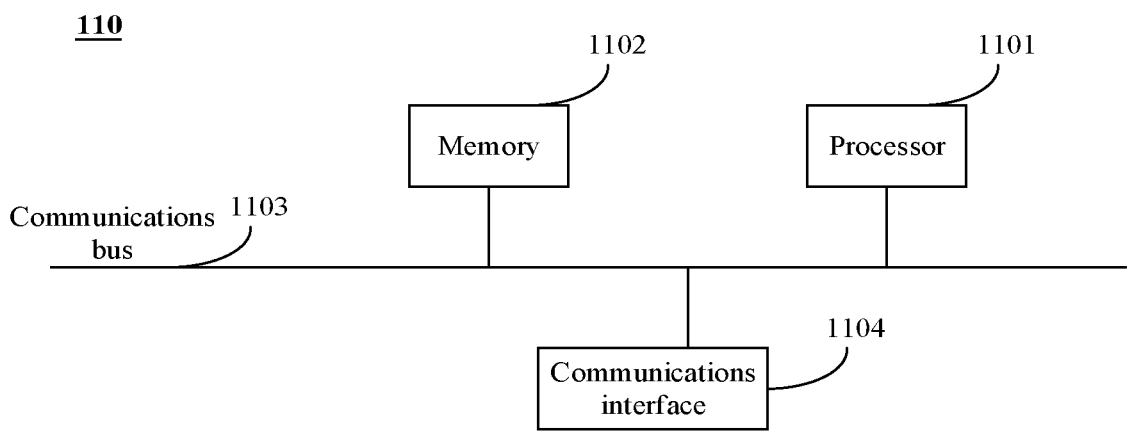
FIG. 11 is a block diagram of a redundancy device in a redundancy network according to an embodiment of this application.

FIG. 11 is a block diagram of a redundancy device in a redundancy network according to an embodiment of this application. The redundancy device may be a switch, a router, a server, a terminal device, or the like. As shown in FIG. 11, a network device 110 includes a processor 1101, a memory 1102, a communications bus 1103, and a communications interface 1104.

The processor 1101, the memory 1102, and the communications interface 1104 are connected to each other by using the communications bus 1103. The communications bus 1103 may be a Peripheral Component Interconnect (PCI) bus, an Extended Industry Standard Architecture (EISA) bus, or the like. The communications bus may be classified into an address bus, a data bus, a control bus, and the like. For ease of representation, only one thick line is used to represent the bus in FIG. 11, but this does not mean that there is only one bus or only one type of bus.

The memory 1102 is configured to store a computer program, where the computer program includes program instructions.

The processor 1101 is configured to invoke the computer program to implement the information sharing method in the redundancy network shown in FIG. 3.

The processor 1101 may be a central processing unit (CPU). The processor 1101 may include one or more processing cores, and the processor 1101 executes various function applications and data processing by running the computer program.

The processor 1101 may further include a hardware chip. The hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof.

The memory 1102 may be configured to store the computer program. Optionally, the memory may store an operating system and an application program unit required by at least one function. The operating system may be an operating system such as a real time operating system (RTX), LINUX, UNIX, WINDOWS, or OS X.

The memory 1102 may be further configured to store device information of the redundancy device.

The memory 1102 may include a volatile memory, for example, a random-access memory (RAM). The memory may alternatively include a non-volatile memory, for example, a flash memory, a hard disk drive (HDD), or a solid-state drive (SSD). The memory 1102 may alternatively include a combination of the foregoing types of memories.

There may be a plurality of communications interfaces 1104, and the communications interface 1104 is configured to communicate with another device. The communications interface 1104 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network (WLAN) interface, a cellular network communications interface, a combination thereof, or the like.

An embodiment of this application further provides a computer storage medium. The computer storage medium stores instructions, and when the instructions are executed, the information sharing method in the redundancy network shown in FIG. 3 is implemented.

An embodiment of this application further provides an information sharing system in a redundancy network. The system includes a plurality of redundancy devices. Each redundancy device may be shown in FIG. 11, or may include the information sharing apparatus in the redundancy network shown in any one of FIG. 8 to FIG. 10. Further, the system may further include a network management device.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

In the embodiments of this application, the terms "first", "second", and "third" are merely used for a purpose of description, and shall not be understood as an indication or implication of relative importance. Unless otherwise explicitly limited, the term "at least one" means one or more, and the term "a plurality of" means two or more.

The term "and/or" in this application describes only an association relationship for describing associated objects and indicates that three relationships may exist. For example, A and/or B may indicate the following three cases: only A exists, both A and B exist, and only B exists. In addition, the character "/" in this specification usually indicates an "or" relationship between the associated objects.

The foregoing descriptions are merely optional embodiments of this application, but are not intended to limit this application. Any modification, equivalent replacement, or improvement made without departing from the concept and principle of this application shall fall within the protection scope of this application.

What is claimed is:

1. A method comprising:
generating a first supervision frame comprising first device information of a first redundancy device, wherein the first device information includes latency information between the first redundancy device and a neighbor redundancy device of the first redundancy device in a redundancy network, wherein the redundancy network is based on a High-availability Seamless Redundancy (HSR) protocol or a Parallel Redundancy Protocol (PRP), wherein the first supervision frame detects whether a second redundancy device on a transmission link on which the first redundancy device is located in the redundancy network is in a working state, and wherein the first supervision frame further comprises a link protocol data unit (LPDU) field carrying the first device information; and
sending, to the second redundancy device and in a multicast manner, the first supervision frame.

2. The method of claim 1, wherein the first supervision frame further comprises an identifier of a target redundancy device, and wherein the identifier instructs the target redundancy device to process the first device information.

3. The method of claim 1, wherein before generating the first supervision frame, the method further comprises obtaining the first device information.

4. The method of claim 1, further comprising:
receiving, from a third redundancy device in the redundancy network, a second supervision frame comprising second device information of the third redundancy device; and
parsing the second supervision frame to obtain the second device information.

5. A first redundancy device in a redundancy network comprising redundancy devices, and wherein the first redundancy device comprises:
a memory configured to store instructions; and
a processor coupled to the memory, wherein when executed by the processor, the instructions cause the first redundancy device to:
generate a first supervision frame comprising first device information of the first redundancy device, wherein the first device information includes latency information between the first redundancy device and a neighbor redundancy device of the first redundancy device in the redundancy network, wherein the redundancy network is based on a High-availability Seamless Redundancy (HSR) protocol or a Parallel Redundancy Protocol (PRP), wherein the first supervision frame detects whether a second redundancy device on a transmission link on which the first redundancy device is located in the redundancy network is in a working state, and wherein the first supervision frame further comprises a link protocol data unit (LPDU) field carrying the first device information; and
send, to the second redundancy device and in a multicast manner, the first supervision frame.

6. The first redundancy device of claim 5, wherein the first supervision frame further comprises an identifier of a target redundancy device, and wherein the identifier instructs the target redundancy device to process the first device information.

7. The first redundancy device of claim 5, wherein when executed by the processor, the instructions further cause the first redundancy device to obtain the first device information.

8. The first redundancy device of claim 5, wherein when executed by the processor, the instructions further cause the first redundancy device to:
receive, from a third redundancy device in the redundancy network, a second supervision frame comprising second device information of the third redundancy device; and
parse the second supervision frame to obtain the second device information.

9. A computer program product comprising computer-executable instructions that are stored on a non-transitory computer-readable medium and that, when executed by a processor, cause a redundancy device in a redundancy network to:
generate a first supervision frame comprising first device information of a first redundancy device, wherein the first device information includes latency information between the first redundancy device and a neighbor redundancy device of the first redundancy device in the redundancy network, wherein the redundancy network is based on a High-availability Seamless Redundancy (HSR) protocol or a Parallel Redundancy Protocol (PRP), wherein the first supervision frame detects whether a second redundancy device on a transmission link on which the first redundancy device is located in the redundancy network is in a working state, and wherein the first supervision frame further comprises a link protocol data unit (LPDU) field carrying the first device information; and
send, to the redundancy devices and in a multicast manner, the first supervision frame.

10. The computer program product of claim 9, wherein the first supervision frame further comprises an identifier of a target redundancy device, and wherein the identifier instructs the target redundancy device to process the first device information of the first redundancy device.

11. The computer program product of claim 9, wherein the computer-executable instructions further cause the first redundancy device to obtain the first device information.

12. The computer program product of claim 9, wherein the computer-executable instructions further cause the first redundancy device to:

receive, from a third redundancy device in the redundancy network, a second supervision frame comprising second device information of the third redundancy device; and parse the second supervision frame to obtain the second device information.

13. The computer program product of claim 9, wherein the computer-executable instructions further cause the first redundancy device to obtain the first device information before generating the first supervision frame.

* * * * *